United States Patent
Watanabe et al.

(10) Patent No.: US 12,472,732 B2
(45) Date of Patent: Nov. 18, 2025

(54) LAMINATE, METHOD FOR MANUFACTURING LAMINATE, AND METHOD FOR MANUFACTURING FLEXIBLE ELECTRONIC DEVICE

(71) Applicant: TOYOBO CO., LTD., Osaka (JP)

(72) Inventors: Naoki Watanabe, Otsu (JP); Harumi Yonemushi, Otsu (JP); Kousuke Sasai, Otsu (JP); Hiroyuki Wakui, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 355 days.

(21) Appl. No.: 17/633,482

(22) PCT Filed: Sep. 30, 2020

(86) PCT No.: PCT/JP2020/037342
§ 371 (c)(1),
(2) Date: Feb. 7, 2022

(87) PCT Pub. No.: WO2021/070719
PCT Pub. Date: Apr. 15, 2021

(65) Prior Publication Data
US 2022/0282052 A1 Sep. 8, 2022

(30) Foreign Application Priority Data
Oct. 8, 2019 (JP) ................................. 2019-185261

(51) Int. Cl.
*B32B 27/28* (2006.01)
*B32B 7/06* (2019.01)
*B32B 17/10* (2006.01)

(52) U.S. Cl.
CPC .............. *B32B 27/281* (2013.01); *B32B 7/06* (2013.01); *B32B 17/10* (2013.01); *B32B 2307/412* (2013.01); *B32B 2457/14* (2013.01)

(58) Field of Classification Search
CPC ..... B32B 27/281; B32B 37/0038; B32B 7/06; B32B 9/045; B32B 17/10; B32B 13/12; B32B 15/08; B32B 19/045; B32B 17/20; B32B 9/005; B32B 2307/412
See application file for complete search history.

(56) References Cited

U.S. PATENT DOCUMENTS

| | | | |
|---|---|---|---|
| 6,613,184 B1 * | 9/2003 | Egitto | ........................ C09J 5/02 |
| | | | 428/420 |
| 2017/0342215 A1 * | 11/2017 | Oka | .................. C08G 73/1078 |
| 2022/0118476 A1 * | 4/2022 | Ostrovsky | ............... C23C 22/83 |
| 2022/0274314 A1 * | 9/2022 | Okuyama | ............... B29C 65/02 |

FOREIGN PATENT DOCUMENTS

| | | | | |
|---|---|---|---|---|
| EP | 1333107 A2 * | 8/2003 | ............. | B05D 3/102 |
| JP | 5152104 B2 | 2/2013 | | |
| JP | 5304490 B2 | 10/2013 | | |
| JP | 5531781 B2 | 6/2014 | | |
| JP | 2017-124587 A | 7/2017 | | |
| JP | 2018-202308 A | 12/2018 | | |
| JP | 2019119126 A * | 7/2019 | | |
| WO | 2013/114685 A1 | 8/2013 | | |
| WO | 2015/041190 A1 | 3/2015 | | |

OTHER PUBLICATIONS

Machine translation of JP2019119126A, published Jul. 2019, Powered by EPO and Google. (Year: 2019).*
Japanese Patent Office, International Search Report in International Patent Application No. PCT/JP2020/037342 (Nov. 24, 2020).
European Patent Office, Extended European Search Report in European Patent Application No. 20874835.0 (Sep. 26, 2023).
International Bureau of WIPO, International Preliminary Report on Patentability in International Patent Application No. PCT/JP2020/037342 (Apr. 12, 2022).
Japan Patent Office, Office Action in Japanese Patent Application No. 2021-551428 (May 9, 2024).
Japan Patent Office, Office Action in Japanese Patent Application No. 2021-551428 (Nov. 28, 2024).

* cited by examiner

Primary Examiner — Monique R Jackson
(74) Attorney, Agent, or Firm — Leydig, Voit & Mayer, Ltd.

(57) ABSTRACT

The purpose is to provide a laminate useful as a temporary support for producing a large-area, high-definition flexible electronic device, the laminate having stably low adhesive strength between a colorless and highly transparent polyimide film and an inorganic substrate even in the case of a large surface area and having few blister defects. The laminate that attains the purpose is obtained by initially wetting either one of an inorganic substrate coated with the silane coupling agent and a colorless polyimide film with an aqueous medium, and then laminating while pressing out the aqueous medium.

8 Claims, No Drawings

LAMINATE, METHOD FOR MANUFACTURING LAMINATE, AND METHOD FOR MANUFACTURING FLEXIBLE ELECTRONIC DEVICE

TECHNICAL FIELD

The present invention relates to a laminate, a method for manufacturing a laminate, and a method for manufacturing a flexible electronic device.

BACKGROUND ART

In recent years, for the purpose of decreasing the weight, size, and thickness of and imparting flexibility to functional elements such as semiconductor elements, MEMS elements, and display elements, technological development for forming these elements on polyimide films has been actively carried out. In other words, as materials for substrates of electronic parts such as information and communication equipment (broadcasting equipment, mobile radio, portable communication equipment, and the like), radar, and high-speed information processing equipment, ceramics which exhibit heat resistance and can cope with increases in frequencies (reaching the GHz band) of the signal band of information and communication equipment have been conventionally used. However, ceramics are not flexible and are also hardly thinned and thus have a drawback that the applicable fields are limited, and thus polyimide films have recently been used as substrates.

When functional elements such as semiconductor elements, MEMS elements, and display elements are formed on the surface of polyimide films, it is ideal to perform processing by a so-called roll-to-roll process utilizing the flexibility that is a property of polyimide films. However, in industries such as semiconductor industry, MEMS industry, and display industry, process technologies for rigid flat substrates such as wafer bases or glass substrate bases have been so far constructed. Hence, in order to form functional elements on polyimide films by utilizing the existing infrastructure, a process is used in which the polyimide films are bonded to, for example, rigid supports (inorganic substrates) formed of inorganic substances such as glass plates, ceramic plates, silicon wafers, and metal plates, desired elements are formed on the laminates, and then the polyimide films and the desired elements are peeled off from the supports.

However, in the process of forming a desired functional element on a laminate in which a polyimide film and a support formed of an inorganic substance are bonded to each other, the laminate is often exposed to a high temperature. For example, in the formation of functional elements such as polysilicon and oxide semiconductors, a step performed in a temperature region of about 200° C. to 600° C. is required. In addition, a temperature of about 200° C. to 300° C. may be applied to the film when a hydrogenated amorphous silicon thin film is fabricated, and heating at about 450° C. to 600° C. may be required in order to heat and dehydrogenate amorphous silicon and obtain low-temperature polysilicon. Hence, the polyimide film constituting the laminate is required to exhibit heat resistance, but as a practical matter, polyimide films which can withstand practical use in such a high temperature region are limited. In addition, it is generally conceivable to use a pressure sensitive adhesive or an adhesive to bond a polyimide film to a support, but heat resistance is also required for the joint surface (namely, the adhesive or pressure sensitive adhesive for bonding) between the polyimide film and the support at that time. However, since ordinary adhesives and pressure sensitive adhesives for bonding do not exhibit sufficient heat resistance, bonding with an adhesive or a pressure sensitive adhesive cannot be adopted when the formation temperature of functional element is high.

Since there are no pressure sensitive adhesives or adhesives exhibiting sufficient heat resistance, a technology in which a polymer solution or a polymer precursor solution is applied onto an inorganic substrate, dried and cured on the inorganic substrate to be formed into a film, and used for these applications has been conventionally adopted in the above-mentioned applications. However, the polyimide film obtained by such means is brittle and easily torn and thus the functional element formed on the surface of this polyimide film is often destroyed when being peeled off from the inorganic substrate. In particular, it is extremely difficult to peel off a large-area film from an inorganic substrate, and it is not possible to attain an industrially viable yield.

In view of these circumstances, a laminate in which a polyimide film which exhibits excellent heat resistance, is tough, and can be thinned is bonded to an inorganic substrate with a silane coupling agent layer, for example, a silane coupling agent interposed therebetween has been proposed as a laminate of a polyimide film and an inorganic substrate for manufacturing a so-called flexible electronic device in which a functional element is formed on a flexible substrate (for example, see Patent Documents 1 to 3).

PRIOR ART DOCUMENTS

Patent Documents

Patent Document 1: JP-B-5152104
Patent Document 2: JP-B-5304490
Patent Document 3: JP-B-5531781

SUMMARY OF THE INVENTION

Problems to be Solved by the Invention

In the above-described laminate, it is intended that the inorganic substrate is easily peeled off from the polyimide film after device formation as well as the inorganic substrate is prevented from peeling off from the polyimide film before and during device formation by interposing a layer including a silane coupling agent layer between the inorganic substrate and the polyimide film.

However, since the adhesive force between the polyimide film and the inorganic substrate varies depending on the thickness of the silane coupling agent layer, it is extremely difficult to control the adhesive force of both companies with uniform adhesive strength over a large area.

A large number of heat-resistant polymers is often colored brown. This coloring is a fatal problem for a type of display element that controls the transmission of light. On the other hand, in a self-luminous display element and a reflection display type display element, there is no problem as long as the heat-resistant polymers are used on the back side. For a large number of sensors and electronic circuit elements that do not correspond to display elements, the coloring of substrates is not a problem. However, in the manufacture of these electronic devices, it is indispensable to form a multi-layer structure having a complicated and precise pattern, and significantly precise alignment is required in the manufacturing process. At that time, when the substrate is less colorless and transparent, it is difficult to detect the positioning mark on the back side of the substrate, and there is a problem that the method for alignment is limited. Hence, when the substrate is not for a transmission type display element as well, the substrate is required to be colorless and transparent in some cases.

Here, particularly when a colorless polyimide is used as a polyimide film, colorless polyimide exhibits higher reactivity than colored polyimide, thus the adhesive strength tends to increase, the tensile elasticity and tensile strength are low, as a result, the film is easily deformed at the time of peeling off and device destruction is likely to occur. Therefore, when a highly colorless and transparent polyimide film is used as a flexible substrate, a more advanced silane coupling agent film thickness control technology is required than before, and the degree of difficulty in this industrial technology can be said to be extremely high.

In other words, when a highly colorless and transparent polyimide film is attached to a large substrate in a peelable state, it is difficult to apply the silane coupling agent layer to the substrate surface so as to have a uniform thickness. Particularly in the glass substrate having a size of 730 mm×920 mm or more, which is called the 4.5th generation, the degree of difficulty is extremely higher compared to the 4th generation (660 mm×800 mm) size, and there are a large number of problems in the industrial production.

Means for Solving the Problems

In view of this situation, the present inventors have continuously conducted diligent research, and as a result, found out a manufacturing method by which it is possible to easily control the thickness of a silane coupling agent layer to be extremely thin and uniform in a large area exceeding the 4.5th generation size as well, and to obtain a high-quality laminate having few blister defects. It has also been found out that a laminate, in which a highly colorless and transparent polyimide film and an inorganic substrate are laminated by an extremely homogeneous and ultra-thin silane coupling agent layer, can be realized by the manufacturing method of the present invention, and a high-quality flexible electronic device can be manufactured by using this laminate.

In other words, the present invention has the following configurations.

[1] A laminate including:
an inorganic substrate;
a silane coupling agent layer; and
a polyimide film of which a yellow index is 10 or less, a light transmittance at a wavelength of 400 nm is 70% or more, a tensile elasticity in both a MD direction and a TD direction is 3 GPa or more, and CTE in both a MD direction and a TD direction is −5 ppm/° C. to +55 ppm/° C.
in this order, in which an initial adhesive strength by a 90-degree peeling method when the polyimide film is peeled off from the laminate is 0.06 N/cm or more and 0.25 N/cm or less.

[2] The laminate according to [1], in which a blister defect density is 5 spots or less per 1 square meter.

[3] The laminate according to [1] or [2], in which the polyimide film is rectangular, has an area of 0.65 square meter or more, and has a rectangular side of at least 700 mm or more.

[4] The laminate according to any one of [1] to [3], in which the silane coupling agent layer is a silane coupling agent.

[5] A method for manufacturing the laminate according to any one of [1] to [4], the method including at least:

(1) a step of coating at least one surface of an inorganic substrate with a silane coupling agent;
(2) a step of wetting either or both of a silane coupling agent-coated surface of the inorganic substrate and a bonding surface side of a polyimide film with an aqueous medium;
(3) a step of stacking a polyimide film on the silane coupling agent-coated surface of the inorganic substrate; and
(4) a step of pressurizing the inorganic substrate and the polyimide film while extruding the aqueous medium from between the silane coupling agent-coated surface of the inorganic substrate and the bonding surface of the polyimide film.

[6] A method for manufacturing the laminate according to any one of [1] to [4], the method including at least:

(1) a step of coating at least one surface of a heat-resistant polyimide film with a silane coupling agent;
(2) a step of wetting either or both of a bonding surface side of an inorganic substrate and a silane coupling agent-coated surface of the polyimide film with an aqueous medium;
(3) a step of stacking the silane coupling agent-coated surface of the heat-resistant polyimide film on the inorganic substrate; and
(4) a step of pressurizing the inorganic substrate and the polyimide film while extruding the aqueous medium from between the bonding surface of the inorganic substrate and the silane coupling agent-coated surface of the polyimide film.

[7] A method for manufacturing a flexible device, the method including a step of forming a functional element on a surface on an opposite side to a bonding surface with an inorganic substrate of a polyimide film of a laminate obtained in the manufacturing process according to [5] or [6].

Effect of the Invention

As described in the prior art, in a laminate of a polyimide film and an inorganic substrate mainly such as a glass plate for manufacturing a flexible electronic device, particularly when the laminate has a large area, it is difficult to homogenously apply a silane coupling agent layer, and as a result, it is difficult to uniformly and properly control the adhesive strength between the polyimide film and the inorganic substrate.

However, according to the present invention, this adhesive strength can be controlled in a range of 0.06 N/cm or more and 0.25 N/cm or less in the case of using a highly colorless and transparent polyimide film as well, further blister defects between the polyimide film and the inorganic substrate are less likely to be generated, a large-area laminate, which is a rectangle having an area of 0.8 square meter and has a side of at least 1 m or more can be realized, and further a method for manufacturing a flexible electronic device having a large area can be provided by using this laminate.

Hereinafter, in order to avoid complication, a highly colorless and transparent polyimide film may be referred to as a polyimide film or a film, and an inorganic substrate may be simply referred to as a substrate.

The present invention is the same as the prior art in that either of a polyimide film or an inorganic substrate is coated with a silane coupling agent and then the two are bonded together (laminated), but is greatly different in that an aqueous medium (pure water or a mixed medium of water and a water-soluble solvent) is interposed between the two and the two are laminated while extruding the aqueous medium from the bonding surface at the time of lamination.

By the method, the excess silane coupling agent between the inorganic substrate and the polyimide film can be removed, and the amount of the silane coupling agent is controlled to the minimum necessary amount coordinated on the surface of at least either of the substrate or the film by the affinity.

It is presumed that the adhesive force between the substrate and the polyimide film changes over time or after the substrate and the polyimide film have undergone a high-temperature process because the reaction of the silane coupling agent, which is excessively present and unreacted, proceeds. However, such an excess unreacted material can be eliminated from the bonding interface between the substrate and the film according to the method of the present invention.

Furthermore, in this bonding method, the excess silane coupling agent is eliminated, thus foreign matters due to the condensation of reactive compounds are less likely to be generated, and at the same time, dust and the like coexisting on the bonding surface are pushed out, thus foreign matters having a particle size at the bonding interface drastically decrease, and as a result, the number of blister defects (also called bubbles, floats, and the like), in which these foreign matters are the nuclei, decreases.

According to the configuration, the silane coupling agent layer is thick enough to have sufficient adhesive strength, there is no excess silane coupling agent, thus the adhesive strength is not too strong, and the initial adhesive strength is in a range of 0.06 N/cm or more and 0.25 N/cm or less. This is clear from Examples as well. In this regard, the present inventors presume that since a large number of OH groups are present on the surface of the inorganic substrate at the initial stage of depositing the silane coupling agent on the inorganic substrate, as a result of binding between the OH groups and the silane coupling agent layer by a hydrogen bond, a chemical reaction and the like, a firm silane coupling agent layer is obtained, but when the deposition time of silane coupling agent is increased, the silane coupling agent layer, which does not necessarily have a firm bond, easily enters the polyimide film, and the adhesive strength changes depending on the entering method and the binding method at the entered location.

In the configuration, it is preferable that the 90-degree initial adhesive strength between the polyimide film and the inorganic substrate is 0.06 N/cm or more and 0.25 N/cm or less.

When the 90-degree initial adhesive strength is 0.06 N/cm or more, it is possible to suitably prevent the polyimide film from peeling off from the inorganic substrate before and during device formation.

When the 90-degree initial adhesive strength is 0.25 N/cm or less, the device can be peeled off without being destroyed at the time of mechanical peeling.

In the configuration, it is preferable that the number of bubbles between the polyimide film and the inorganic substrate is 1 or less per 500 mm×500 mm.

When the number of bubbles is 1 or less per 500 mm×500 mm, it is possible to remarkably decrease the possibility that the device is destroyed by the growth of bubbles when the device is fabricated on the polyimide film.

MODE FOR CARRYING OUT THE INVENTION

The polyimide film in the present invention is a polymer film having an imide bond in the main chain, and is preferably a polyimide film, a polyamide-imide film, or a polyamide film, more preferably a polyimide film or a polyamide-imide film, still more preferably a polyimide film.

Generally, a polyimide film is obtained by applying a polyamic acid (polyimide precursor) solution obtained by a reaction between a diamine and a tetracarboxylic acid in a solvent to a support for polyimide film fabrication, drying the solution to form a green film (also called "precursor film" or "polyamic acid film"); and treating the green film by heat at a high temperature on the support for polyimide film fabrication or in a state of being peeled off from the support to cause a dehydration ring-closure reaction. As another method, a polyimide film is obtained by applying a polyimide solution obtained by a dehydration ring-closure reaction between a diamine and a tetracarboxylic acid in a solvent to a support for polyimide film fabrication, drying the solution to form a polyimide film containing a solvent at 1% to 50% by weight, and treating the polyimide film containing a solvent at 1% to 50% by weight at a high temperature for drying on the support for polyimide film fabrication or in a state of being peeled off from the support.

Generally, a polyamide-imide film is obtained by applying a polyamide-imide solution obtained by reacting a diisocyanate with a tricarboxylic in a solvent to a support for polyamide-imide film fabrication, drying the solution to form a polyamide-imide film containing a solvent at 1% to 50% by weight, and treating the polyamide-imide film containing a solvent at 1% to 50% by weight at a high temperature for drying on the support for polyamide-imide film fabrication or in a state of being peeled off from the support.

Generally, a polyamide film is obtained by applying a polyamide solution obtained by reacting a diamine and a dicarboxylic acid in a solvent to a support for polyamide film fabrication, drying the solution to form a polyamide film containing a solvent at 1% to 50% by weight, and treating the polyamide film containing a solvent at 1% to 50% by weight at a high temperature for drying on the support for polyamide film fabrication or in a state of being peeled off from the support.

As the tetracarboxylic acids, tricarboxylic acids, and dicarboxylic acids, it is possible to use aromatic tetracarboxylic acids (including acid anhydrides thereof), aliphatic tetracarboxylic acids (including acid anhydrides thereof), alicyclic tetracarboxylic acids (including acid anhydrides thereof), aromatic tricarboxylic acids (including acid anhydrides thereof), aliphatic tricarboxylic acids (including acid anhydrides thereof), alicyclic tricarboxylic acids (including acid anhydrides thereof), aromatic dicarboxylic acids, aliphatic dicarboxylic acids, alicyclic dicarboxylic acids and the like that are usually used in the polyimide synthesis, polyamide-imide synthesis, and polyamide synthesis. Among these, aromatic tetracarboxylic anhydrides and alicyclic tetracarboxylic anhydrides are preferable, aromatic tetracarboxylic anhydrides are more preferable from the viewpoint of heat resistance, and alicyclic tetracarboxylic acids are more preferable from the viewpoint of light transmittance. In a case where tetracarboxylic acids are acid anhydrides, the acid anhydrides may have one anhydride structure or two anhydride structures in the molecule, but one (dianhydride) having two anhydride structures in the molecule is preferable. Tetracarboxylic acids, tricarboxylic acids, and dicarboxylic acids may be used singly or in combination of two or more kinds thereof.

Examples of the aromatic tetracarboxylic acids for obtaining a highly colorless and transparent polyimide in the present invention include tetracarboxylic acids such as 4,4'-(2,2-hexafluoroisopropyridene)diphthalic acid, 4,4'-oxydiphthalic acid, bis(1,3-dioxo-1,3-dihydro-2-benzofuran-5-carboxylic acid) 1,4-phenylene, bis(1,3-dioxo-1,3-dihydro-2-benzofuran-5-yl)benzene-1,4-dicarboxylate, 4,4'-[4,4'-(3-oxo-1,3-dihydro-2-benzofuran-1,1-diyl) bis(benzene-1,4-diyloxy)]dibenzene-1,2-dicarboxylic acid, 3,3',4,4'-benzophenonetetracarboxylic acid, 4,4'-[(3-oxo-1,3-dihydro-2-benzofuran-1,1-diyl) bis(toluene-2,5-diyloxy)] dibenzene-1,2-dicarboxylic acid, 4,4'-[(3-oxo-1,3-dihydro-2-benzofuran-1,1-diyl) bis(1,4-xylene-2,5-diyloxy)] dibenzene-1,2-dicarboxylic acid, 4,4'-[4,4'-(3-oxo-1,3-dihydro-2-benzofuran-1,1-diyl) bis(4-isopropyl-toluene-2,5-diyloxy)]dibenzene-1,2-dicarboxylic acid, 4,4'-[4,4'-(3-oxo-1,3-dihydro-2-benzofuran-1,1-diyl) bis(naphthalene-1,4-diyloxy)]dibenzene-1,2-dicarboxylic acid, 4,4'-[4,4'-(3H-2,1-benzoxathiol-1,1-dioxide-3,3-diyl) bis(benzene-1,4-diyloxy)]dibenzene-1,2-dicarboxylic acid, 4,4'-benzophenone tetracarboxylic acid, 4,4'-[(3H-2,1-benzoxathiol-1,1-dioxide-3,3-diyl) bis(toluene-2,5-diyloxy)]dibenzene-1,2-dicarboxylic acid, 4,4'-[(3H-2,1-benzoxathiol-1,1-dioxide-3,3-diyl) bis(1,4-xylene-2,5-diyloxy)]dibenzene-1,2-dicarboxylic acid, 4,4'-[4,4'-(3H-2,1-benzoxathiol-1,1-dioxide-3,3-diyl) bis(4-isopropyl-toluene-2,5-diyloxy)]dibenzene-1,2-dicarboxylic acid, 4,4'-[4,4'-(3H-2,1-benzoxathiol-1,1-dioxide-3,3-diyl) bis (naphthalene-1,4-diyloxy)]dibenzene-1,2-dicarboxylic acid, 3,3',4,4'-benzophenonetetracarboxylic acid, 3,3',4,4'-benzophenonetetracarboxylic acid, 3,3',4,4'-diphenylsulfonetetracarboxylic acid, 3,3',4,4'-biphenyltetracarboxylic acid, 2,3,3',4'-biphenyltetracarboxylic acid, and pyromellitic acid, and acid anhydrides thereof. Among these, dianhydrides having two acid anhydride structures are suitable, and particularly 4,4'-(2,2-hexafluoroisopropyridene)diphthalic dianhydride and 4,4'-oxydiphthalic dianhydride are preferable. The aromatic tetracarboxylic acids may be used singly or in combination of two or more kinds thereof. For obtaining high heat resistance, the amount of the aromatic tetracarboxylic acids is, for example, preferably 50% by mass or more, more preferably 60% by mass or more, still more preferably 70% by mass or more, yet still more preferably 80% by mass or more of the total amount of all the tetracarboxylic acids.

Examples of the alicyclic tetracarboxylic acids include tetracarboxylic acids such as 1,2,3,4-cyclobutanetetracarboxylic acid, 1,2,3,4-cyclopentanetetracarboxylic acid, 1,2,3,4-cyclohexanetetracarboxylic acid, 1,2,4,5-cyclohexanetetracarboxylic acid, 3,3',4,4'-bicyclohexyltetracarboxylic acid, bicyclo[2,2,1]heptane-2,3,5,6-tetracarboxylic acid, bicyclo[2,2,2]octane-2,3,5,6-tetracarboxylic acid, bicyclo[2,2,2]octo-7-ene-2,3,5,6-tetracarboxylic acid, tetrahydroanthracene-2,3,6,7-tetracarboxylic acid, tetradecahydro-1,4:5,8:9,10-trimethanoanthracene-2,3,6,7-tetracarboxylic acid, decahydronaphthalene-2,3,6,7-tetracarboxylic acid, decahydro-1,4:5,8-dimethanonaphthalene-2,3,6,7-tetracarboxylic acid, decahydro-1,4-ethano-5,8-methanonaphthalene-2,3,6,7-tetracarboxylic acid, norbornane-2-spiro-α-cyclopentanone-α'-spiro-2"-norbornane-5,5",6,6"-tetracarboxylic acid (also known as "norbornane-2-spiro-2'-cyclopentanone-5'-spiro-2"-norbornane-5,5",6,6"-tetracarboxylic acid"), methylnorbornane-2-spiro-α-cyclopentanone-α'-spiro-2"-(methylnorbornane)-5,5",6,6"-tetracarboxylic acid, norbornane-2-spiro-α-cyclohexanone-α'-spiro-2"-norbornane-5,5",6,6"-tetracarboxylic acid (also known as "norbornane-2-spiro-2'-cyclohexanone-6'-spiro-2"-norbornane-5,5",6,6"-tetracarboxylic acid"), methylnorbornane-2-spiro-α-cyclohexanone-α'-spiro-2"-(methylnorbornane)-5,5",6,6"-tetracarboxylic acid, norbornane-2-spiro-α-cyclopropanone-α'-spiro-2"-norbornane-5,5",6,6"-tetracarboxylic acid, norbornane-2-spiro-α-cyclobutanone-α'-spiro-2"-norbornane-5,5",6,6"-tetracarboxylic acid, norbornane-2-spiro-α-cycloheptanone-α'-spiro-2"-norbornane-5,5",6,6"-tetracarboxylic acid, norbornane-2-spiro-α-cyclooctanone-α'-spiro-2"-norbornane-5,5",6,6"-tetracarboxylic acid, norbornane-2-spiro-α-cyclononanone-α'-spiro-2"-norbornane-5,5",6,6"-tetracarboxylic acid, norbornane-2-spiro-α-cyclodecanone-α'-spiro-2"-norbornane-5,5",6,6"-tetracarboxylic acid, norbornane-2-spiro-α-cycloundecanone-α'-spiro-2"-norbornane-5,5",6,6"-tetracarboxylic acid, norbornane-2-spiro-α-cyclododecanone-α'-spiro-2"-norbornane-5,5",6,6"-tetracarboxylic acid, norbornane-2-spiro-α-cyclotridecanone-α'-spiro-2"-norbornane-5,5",6,6"-tetracarboxylic acid, norbornane-2-spiro-α-cyclotetradecanone-α'-spiro-2"-norbornane-5,5",6,6"-tetracarboxylic acid, norbornane-2-spiro-α-cyclopentadecanone-α'-spiro-2"-norbornane-5,5",6,6"-tetracarboxylic acid, norbornane-2-spiro-α-(methylcyclopentanone)-α'-spiro-2"-norbornane-5,5",6,6"-tetracarboxylic acid, and norbornane-2-spiro-α-(methylcyclohexanone)-α'-spiro-2"-norbornane-5,5",6,6"-tetracarboxylic acid, and acid anhydrides thereof. Among these, dianhydrides having two acid anhydride structures are suitable, particularly 1,2,3,4-cyclobutanetetracarboxylic dianhydride, 1,2,3,4-cyclohexanetetracarboxylic dianhydride, and 1,2,4,5-cyclohexanetetracarboxylic dianhydride are preferable, 1,2,3,4-cyclobutanetetracarboxylic dianhydride and 1,2,4,5-cyclohexanetetracarboxylic dianhydride are more preferable, and 1,2,3,4-cyclobutanetetracarboxylic dianhydride is still more preferable. These may be used singly or in combination of two or more kinds thereof. For obtaining high transparency, the amount of the alicyclic tetracarboxylic acids is, for example, preferably 50% by mass or more, more preferably 60% by mass or more, still more preferably 70% by mass or more, yet still more preferably 80% by mass or more of the total amount of all the tetracarboxylic acids.

Examples of the tricarboxylic acids include aromatic tricarboxylic acids such as trimellitic acid, 1,2,5-naphthalenetricarboxylic acid, diphenyl ether-3,3',4'-tricarboxylic acid, and diphenylsulfone-3,3',4'-tricarboxylic acid, or hydrogenated products of the aromatic tricarboxylic acids such as hexahydrotrimellitic acid, and alkylene glycol bistrimellitates such as ethylene glycol bistrimellitate, propylene glycol bistrimellitate, 1,4-butanediol bistrimellitate, and polyethylene glycol bistrimellitate and monoanhydrides and esterified products thereof. Among these, monoanhydrides having one acid anhydride structure are suitable, and particularly trimellitic anhydride and hexahydrotrimellitic anhydride are preferable. These may be used singly or a plurality of these may be used in combination.

Examples of the dicarboxylic acids include aromatic dicarboxylic acids such as terephthalic acid, isophthalic acid, orthophthalic acid, naphthalenedicarboxylic acid, and 4,4'-oxydibenzenecarboxylic acid, or hydrogenated products of the aromatic dicarboxylic acids such as 1,6-cyclohexanedicarboxylic acid, and oxalic acid, succinic acid, glutaric acid, adipic acid, heptanedioic acid, octanedioic acid, azelaic acid, sebacic acid, undecadic acid, dodecanedioic acid, and 2-methylsuccinic acid and acid chlorides or esterified products thereof. Among these, aromatic dicarboxylic acids and hydrogenated products thereof are suitable, and particularly terephthalic acid, 1,6-cyclohexanedicarboxylic acid, and 4,4'-oxydibenzenecarboxylic acid are preferable. The dicarboxylic acids may be used singly or a plurality of these may be used in combination.

The diamines or isocyanates for obtaining the highly colorless and transparent polyimide in the present invention are not particularly limited, and it is possible to use aromatic diamines, aliphatic diamines, alicyclic diamines, aromatic diisocyanates, aliphatic diisocyanates, alicyclic diisocyanates and the like that are usually used in the polyimide synthesis, polyamide-imide synthesis, and polyamide synthesis. Aromatic diamines are preferable from the viewpoint of heat resistance, and alicyclic diamines are preferable from the viewpoint of transparency. When aromatic diamines having a benzoxazole structure are used, a high elastic modulus, low heat shrinkability, and a low coefficient of linear thermal expansion as well as high heat resistance can be exerted. The diamines and isocyanates may be used singly or in combination of two or more kinds thereof.

Examples of the aromatic diamines include: 2,2'-dimethyl-4,4'-diaminobiphenyl; 1,4-bis[2-(4-aminophenyl)-2-propyl]benzene(bisaniline); 1,4-bis(4-amino-2-trifluoromethylphenoxy)benzene; 2,2'-ditrifluoromethyl-4,4'-diaminobiphenyl; 4,4'-bis(4-aminophenoxy)biphenyl; 4,4'-bis(3-aminophenoxy)biphenyl; bis[4-(3-aminophenoxy)phenyl]ketone; bis[4-(3-aminophenoxy)phenyl]sulfide; bis[4-(3-aminophenoxy)phenyl]sulfone; 2,2-bis[4-(3-aminophenoxy)phenyl]propane; 2,2-bis[4-(3-aminophenoxy)phenyl]-1,1,1,3,3,3-hexafluoropropane; m-phenylenediamine; o-phenylenediamine; p-phenylenediamine; m-aminobenzylamine; p-aminobenzylamine; 3,3'-diaminodiphenylether; 3,4'-diaminodiphenylether; 4,4'-diaminodiphenylether; 3,3'-diaminodiphenylsulfide; 3,3'-diaminodiphenylsulfoxide; 3,4'-diaminodiphenylsulfoxide; 4,4'-diaminodiphenylsulfoxide; 3,3'-diaminodiphenyl sulfone; 3,4'-diaminodiphenyl sulfone; 4,4'-diaminodiphenyl sulfone; 3,3'-diaminobenzophenone; 3,4'-diaminobenzophenone; 4,4'-diaminobenzophenone; 3,3'-diaminodiphenylmethane; 3,4'-diaminodiphenylmethane; 4,4'-diaminodiphenylmethane; bis[4-(4-aminophenoxy)phenyl]methane; 1,1-bis[4-(4-aminophenoxy)phenyl]ethane; 1,2-bis[4-(4-aminophenoxy)phenyl]ethane; 1,1-bis[4-(4-aminophenoxy)phenyl]propane; 1,2-bis[4-(4-aminophenoxy)phenyl]propane; 1,3-bis[4-(4-aminophenoxy)phenyl]propane; 2,2-bis[4-(4-aminophenoxy)phenyl]propane; 1,1-bis[4-(4-aminophenoxy)phenyl]butane; 1,3-bis[4-(4-aminophenoxy)phenyl]butane; 1,4-bis[4-(4-aminophenoxy)phenyl]butane; 2,2-bis[4-(4-aminophenoxy)phenyl]butane; 2,3-bis[4-(4-aminophenoxy)phenyl]butane; 2-[4-(4-aminophenoxy)phenyl]-2-[4-(4-aminophenoxy)-3-methylphenyl]propane; 2,2-bis[4-(4-aminophenoxy)-3-methylphenyl]propane; 2-[4-(4-aminophenoxy)phenyl]-2-[4-(4-aminophenoxy)-3,5-dimethylphenyl]propane; 2,2-bis[4-(4-aminophenoxy)-3,5-dimethylphenyl]propane; 2,2-bis[4-(4-aminophenoxy)phenyl]-1,1,1,3,3,3-hexafluoropropane; 1,4-bis(3-aminophenoxy)benzene; 1,3-bis(3-aminophenoxy)benzene; 1,4-bis(4-aminophenoxy)benzene; 4,4'-bis(4-aminophenoxy)biphenyl; bis[4-(4-aminophenoxy)phenyl]ketone; bis[4-(4-aminophenoxy)phenyl]sulfide; bis[4-(4-aminophenoxy)phenyl]sulfoxide; bis[4-(4-aminophenoxy)phenyl]sulfone; bis[4-(3-aminophenoxy)phenyl]ether; bis[4-(4-aminophenoxy)phenyl]ether; 1,3-bis[4-(4-aminophenoxy)benzoyl]benzene; 1,3-bis[4-(3-aminophenoxy)benzoyl]benzene; 1,4-bis[4-(3-aminophenoxy)benzoyl]benzene; 4,4'-bis[(3-aminophenoxy)benzoyl]benzene; 1,1-bis[4-(3-aminophenoxy)phenyl]propane; 1,3-bis[4-(3-aminophenoxy)phenyl]propane; 3,4'-diaminodiphenylsulfide; 2,2-bis[3-(3-aminophenoxy)phenyl]-1,1,1,3,3,3-hexafluoropropane; bis[4-(3-aminophenoxy)phenyl]methane; 1,1-bis[4-(3-aminophenoxy)phenyl]ethane; 1,2-bis[4-(3-aminophenoxy)phenyl]ethane; bis[4-(3-aminophenoxy)phenyl]sulfoxide; 4,4'-bis[3-(4-aminophenoxy)benzoyl]diphenylether; 4,4'-bis[3-(3-aminophenoxy)benzoyl]diphenylether; 4,4'-bis[4-(4-amino-α,α-dimethylbenzyl)phenoxy]benzophenone; 4,4'-bis[4-(4-amino-α,α-dimethylbenzyl)phenoxy]diphenyl sulfone; bis[4-{4-(4-aminophenoxy)phenoxy}phenyl] sulfone; 1,4-bis[4-(4-aminophenoxy)phenoxy-α,α-dimethylbenzyl]benzene; 1,3-bis[4-(4-aminophenoxy)phenoxy-α,α-dimethylbenzyl]benzene; 1,3-bis[4-(4-amino-6-trifluoromethylphenoxy)-α,α-dimethylbenzyl]benzene; 1,3-bis[4-(4-amino-6-fluorophenoxy)-α,α-dimethylbenzyl]benzene; 1,3-bis[4-(4-amino-6-methylphenoxy)-α,α-dimethylbenzyl]benzene; 1,3-bis[4-(4-amino-6-cyanophenoxy)-α,α-dimethylbenzyl]benzene; 3,3'-diamino-4,4'-diphenoxybenzophenone; 4,4'-diamino-5,5'-diphenoxybenzophenone; 3,4'-diamino-4,5'-diphenoxybenzophenone; 3,3'-diamino-4-phenoxybenzophenone; 4,4'-diamino-5-phenoxybenzophenone; 3,4'-diamino-4-phenoxybenzophenone; 3,4'-diamino-5'-phenoxybenzophenone; 3,3'-diamino-4,4'-dibiphenoxybenzophenone; 4,4'-diamino-5,5'-dibiphenoxybenzophenone; 3,4'-diamino-4,5'-dibiphenoxybenzophenone; 3,3'-diamino-4-biphenoxybenzophenone; 4,4'-diamino-5-biphenoxybenzophenone; 3,4'-diamino-4-biphenoxybenzophenone; 3,4'-diamino-5'-biphenoxybenzophenone; 1,3-bis(3-amino-4-phenoxybenzoyl)benzene; 1,4-bis(3-amino-4-phenoxybenzoyl)benzene; 1,3-bis(4-amino-5-phenoxybenzoyl)benzene; 1,4-bis(4-amino-5-phenoxybenzoyl)benzene; 1,3-bis(3-amino-4-biphenoxybenzoyl)benzene, 1,4-bis(3-amino-4-biphenoxybenzoyl)benzene; 1,3-bis(4-amino-5-biphenoxybenzoyl)benzene; 1,4-bis(4-amino-5-biphenoxybenzoyl)benzene; 2,6-bis[4-(4-amino-α,α-dimethylbenzyl)phenoxy]benzonitrile; and aromatic diamines obtained by substituting a part or all of hydrogen atoms on an aromatic ring of the above-described aromatic diamines with halogen atoms; alkyl groups or alkoxyl groups having 1 to 3 carbon atoms; cyano groups; or halogenated alkyl groups or alkoxyl groups having 1 to 3 carbon atoms, in which a part or all of hydrogen atoms of an alkyl group or alkoxyl group are substituted with halogen atoms. The aromatic diamines having a benzoxazole structure are not particularly limited, and examples thereof include: 5-amino-2-(p-aminophenyl)benzoxazole; 6-amino-2-(p-aminophenyl)benzoxazole; 5-amino-2-(m-aminophenyl)benzoxazole; 6-amino-2-(m-aminophenyl)benzoxazole; 2,2'-p-phenylenebis(5-aminobenzoxazole); 2,2'-p-phenylenebis(6-aminobenzoxazole); 1-(5-aminobenzoxazolo)-4-(6-aminobenzoxazolo)benzene; 2,6-(4,4'-diaminodiphenyl)benzo[1,2-d:5,4-d']bisoxazole; 2,6-(4,4'-diaminodiphenyl)benzo[1,2-d:4,5-d']bisoxazole; 2,6-(3,4'-diaminodiphenyl)benzo[1,2-d:5,4-d']bisoxazole; 2,6-(3,4'-diaminodiphenyl)benzo[1,2-d:4,5-d']bisoxazole; 2,6-(3,3'-diaminodiphenyl)benzo[1,2-d:5,4-d']bisoxazole; and 2,6-(3,3'-diaminodiphenyl)benzo[1,2-d:4,5-d']bisoxazole. Among these, particularly 2,2'-ditrifluoromethyl-4,4'-diaminobiphenyl, 4-amino-N-(4-aminophenyl)benzamide, 4,4'-diaminodiphenyl sulfone, and 3,3'-diaminobenzophenone are preferable. The aromatic diamines may be used singly or a plurality of these may be used in combination.

Examples of the alicyclic diamines include 1,4-diaminocyclohexane, 1,4-diamino-2-methylcyclohexane, 1,4-diamino-2-ethylcyclohexane, 1,4-diamino-2-n-propylcyclohexane, 1,4-diamino-2-isopropylcyclohexane, 1,4-diamino-2-n-butylcyclohexane, 1,4-diamino-2-isobutylcyclohexane, 1,4-diamino-2-sec-butylcyclohexane, 1,4-diamino-2-tert-butylcyclohexane, and 4,4'-methylenebis(2,6-dimethylcyclohexylamine). Among these, particularly 1,4-diaminocyclohexane and 1,4-diamino-2-methylcyclohexane are preferable, and 1,4-diaminocyclohexane is more preferable. The alicyclic diamines may be used singly or a plurality of these may be used in combination.

Examples of the diisocyanates include aromatic diisocyanates such as diphenylmethane-2,4'-diisocyanate, 3,2'- or 3,3'- or 4,2'- or 4,3'- or 5,2'- or 5,3'- or 6,2'- or 6,3'-dimethyldiphenylmethane-2,4'-diisocyanate, 3,2'- or 3,3'- or 4,2'- or 4,3'- or 5,2'- or 5,3'- or 6,2'- or 6,3'-diethyldiphenylmethane-2,4'-diisocyanate, 3,2'- or 3,3'- or 4,2'- or 4,3'- or 5,2'- or 5,3'- or 6,2'- or 6,3'-dimethoxydiphenylmethane-2,4'-diisocyanate, diphenylmethane-4,4'-diisocyanate, diphenylmethane-3,3'-diisocyanate, diphenylmethane-3,4'-diisocyanate, diphenyl ether-4,4'-diisocyanate, benzophenone-4,4'-diisocyanate, diphenylsulfone-4,4'-diisocyanate, tolylene-2,4-diisocyanate, tolylene-2,6-diisocyanate, m-xylylene diisocyanate, p-xylylene diisocyanate, naphthalene-2,6-diisocyanate, 4,4'-(2,2 bis(4-phenoxyphenyl)propane)diisocyanate, 3,3'- or 2,2'-dimethylbiphenyl-4,4'-diisocyanate, 3,3'- or 2,2'-diethylbiphenyl-4,4'-diisocyanate, 3,3'-dimethoxybiphenyl-4,4'-diisocyanate, and 3,3'-diethoxybiphenyl-4,4'-diisocyanate, and hydrogenated diisocyanates of any of these (for example, isophorone diisocyanate, 1,4-cyclohexane diisocyanate, 1,3-cyclohexane diisocyanate, 4,4'-dicyclohexylmethane diisocyanate, and hexamethylene diisocyanate). Among these, diphenylmethane-4,4'-diisocyanate, tolylene-2,4-diisocyanate, tolylene-2,6-diisocyanate, 3,3'-dimethylbiphenyl-4,4'-diisocyanate, naphthalene-2,6-diisocyanate, 4,4'-dicyclohexylmethane diisocyanate, and 1,4-cyclohexane diisocyanate are preferable from the viewpoint of low moisture absorption property, dimensional stability, price, and polymerizability. The diisocyanates may be used singly or a plurality of these may be used in combination.

The yellow index of the polyimide film in the present invention is preferably 10 or less, more preferably 7 or less, still more preferably 5 or less, yet still more preferably 3 or less. The lower limit of the yellow of the polyimide film is not particularly limited, but is preferably 0.1 or more, more preferably 0.2 or more, still more preferably 0.3 or more for use as a flexible electronic device.

The light transmittance of the polyimide film at a wavelength of 400 nm in the present invention is preferably 70% or more, more preferably 72% or more, still more preferably 75% or more, yet still more preferably 80% or more. The upper limit of the light transmittance of the polyimide film at a wavelength of 400 nm is not particularly limited, but is preferably 99% or less, more preferably 98% or less, still more preferably 97% or less for use as a flexible electronic device.

The total light transmittance of the polyimide film in the present invention is preferably 85% or more, more preferably 86% or more, still more preferably 87% or more, yet still more preferably 88% or more. The upper limit of the total light transmittance of the polyimide film is not particularly limited, but is preferably 99% or less, more preferably 98% or less, still more preferably 97% or less for use as a flexible electronic device.

The haze of the polyimide film in the present invention is preferably 1.0 or less, more preferably 0.8 or less, still more preferably 0.5 or less, yet still more preferably 0.3 or less. The upper limit of the light transmittance of the polyimide film at a wavelength of 400 nm is not particularly limited, but is preferably 99% or less, more preferably 98% or less, still more preferably 97% or less for use as a flexible electronic device.

The thickness of the polyimide film in the present invention is preferably 3 μm or more, more preferably 11 μm or more, still more preferably 24 μm or more, yet still more preferably 45 μm or more. The upper limit of the thickness of the polyimide film is not particularly limited but is preferably 250 μm or less, more preferably 150 μm or less, still more preferably 90 μm or less for use as a flexible electronic device.

The average CTE of the polyimide film at between 30° C. and 300° C. in the present invention is preferably −5 ppm/° C. to +55 ppm/° C., more preferably −5 ppm/° C. to +45 ppm/° C., still more preferably −5 ppm/° C. to +35 ppm/° C., yet still more preferably −5 ppm/° C. to +20 ppm/° C., far still more preferably 1 ppm/° C. to +10 ppm/° C. When the CTE is in the above range, a small difference in coefficient of linear thermal expansion between the polyimide film and a general support (inorganic substrate) can be maintained, and the polyimide film and the inorganic substrate can be prevented from peeling off from each other when being subjected to a process of applying heat as well. Here, CTE is a factor that represents reversible expansion and contraction with respect to temperature. The CTE of the polyimide film refers to the average value of the CTE in the machine direction (MD direction) and the CTE in the transverse direction (TD direction) of the polyimide film. The method for measuring the CTE of the polyimide film is as described in Examples.

The highly colorless and transparent polyimide film having the coefficient of linear thermal expansion of the present invention can be realized by performing stretching in the course of forming the polyimide film. Such stretching operation can be realized by performing stretching by 1.5 to 4.0 times in the MD direction and 1.4 to 3.0 times in the TD direction in the course of applying a polyimide solution to a support for polyimide film fabrication, drying the solution to form a polyimide film containing a solvent at 1% to 50% by weight, and treating the polyimide film containing a solvent at 1% to 50% by weight at a high temperature for drying on the support for polyimide film fabrication or in a state of being peeled off from the support. At this time, by stretching the thermoplastic polymer film and the polyimide film at the same time using an unstretched thermoplastic polymer film as the support for polyimide film fabrication and then peeling off the stretched polyimide film from the thermoplastic polymer film, it is possible to prevent the polyimide film from being scratched at the time of stretching in the MD direction and to obtain a highly colorless and transparent polyimide film with higher quality.

The heat shrinkage rate of the polyimide film of the present invention at between 30° C. and 500° C. is preferably ±0.9%, still more preferably ±0.6%. The heat shrinkage rate is a factor that represents irreversible expansion and contraction with respect to the temperature.

The tensile breaking strength of the polyimide film of the present invention is preferably 60 MPa or more, more preferably 120 MP or more, still more preferably 240 MPa or more. The upper limit of the tensile breaking strength is not particularly limited but is practically less than about 1000 MPa. When the tensile breaking strength is 60 MPa or more, it is possible to prevent the polyimide film from breaking when being peeled off from the inorganic substrate. The tensile breaking strength of the polyimide film refers to the average value of the tensile breaking strength in the machine direction (MD direction) and the tensile breaking strength in the transverse direction (TD direction) of the polyimide film. The method for measuring the tensile breaking strength of the polyimide film is as described in Examples.

The tensile breaking elongation of the polyimide film of the present invention is preferably 1% or more, more preferably 5% or more, still more preferably 10% or more. When the tensile breaking elongation is 1% or more, the handleability is excellent. The tensile breaking elongation of the polyimide film refers to the average value of the tensile breaking elongation in the machine direction (MD direction) and the tensile breaking elongation in the transverse direction (TD direction) of the polyimide film. The method for measuring the tensile breaking elongation of the polyimide film is as described in Examples.

The tensile elasticity of the polyimide film of the present invention is preferably 3 GPa or more, more preferably 4 GPa or more, still more preferably 5 GPa or more. When the tensile elasticity is 3 GPa or more, the polyimide film is less expanded and deformed when being peeled off from the inorganic substrate and exhibits excellent handleability. The tensile elasticity is preferably 20 GPa or less, more preferably 12 GPa or less, still more preferably 10 GPa or less. When the tensile elasticity is 20 GPa or less, the polyimide film can be used as a flexible film. The tensile elasticity of the polyimide film refers to the average value of the tensile elasticity in the machine direction (MD direction) and the tensile elasticity in the transverse direction (TD direction) of the polyimide film. The method for measuring the tensile elasticity of the polyimide film is as described in Examples.

Unevenness of the thickness of the polyimide film of the present invention is preferably 20% or less, more preferably 12% or less, still more preferably 7% or less, particularly preferably 4% or less. When the evenness of the thickness exceeds 20%, the polyimide film tends to be hardly applied to a narrow part. Incidentally, unevenness of the thickness of a film can be determined based on the following equation from film thicknesses, which are measured at about 10 randomly extracted points of a film to be measured by using, for example, a contact-type film thickness meter.

Unevenness of thickness of film(%)=100×(maximum film thickness−minimum film thickness)÷average film thickness The polyimide film of the present invention is preferably obtained in the form of being wound as a long polyimide film having a width of 300 mm or more and a length of 10 m or more at the time of production, more preferably in the form of a roll-shaped polyimide film wound around a winding core. When the polyimide film is wound in a roll shape, it is easy to transport the polyimide film in the form of a polyimide film wound in a roll shape.

In the polyimide film of the present invention, in order to secure handleability and productivity, it is preferable to impart fine unevenness to the polyimide film surface and secure slipperiness by adding/containing a lubricant (particles) having a particle size of about 10 to 1000 nm in the polyimide film at about 0.03% to 3% by mass.

The inorganic substrate of the present invention is only required to be a plate-shaped substrate that can be used as a substrate formed of an inorganic substance, and examples thereof include those mainly composed of glass plates, ceramic plates, semiconductor wafers, metals and the like and those in which these glass plates, ceramic plates, semiconductor wafers, and metals are laminated, those in which these are dispersed, and those in which fibers of these are contained as the composite of these.

In the present invention, an inorganic substrate, which does not contain nitrogen as a constituent element, is preferably used.

Examples of the glass plates include quartz glass, high silicate glass (96% silica), soda lime glass, lead glass, aluminoborosilicate glass, and borosilicate glass (Pyrex (registered trademark)), borosilicate glass (alkali-free), borosilicate glass (microsheet), aluminosilicate glass and the like. Among these, those having a coefficient of linear thermal expansion of 5 ppm/K or less are desirable, and in the case of a commercially available product, "Corning (registered trademark) 7059", "Corning (registered trademark) 1737", and "EAGLE" manufactured by Corning Inc., "AN100" manufactured by AGC Inc., "OA10" and "OA11" manufactured by Nippon Electric Glass Co., Ltd., "AF32" manufactured by SCHOTT AG, and the like that are glass for liquid crystals are desirable.

The semiconductor wafer is not particularly limited, but examples thereof include a silicon wafer and wafers of germanium, silicon-germanium, gallium-arsenide, aluminum-gallium-indium, nitrogen-phosphorus-arsenic-antimony, SiC, InP (indium phosphide), InGaAs, GaInNAs, LT, LN, ZnO (zinc oxide), CdTe (cadmium telluride), ZnSe (zinc selenide) and the like. Among these, the wafer preferably used is a silicon wafer, and a mirror-polished silicon wafer having a size of 8 inches or more is particularly preferable.

The metals include single element metals such as W, Mo, Pt, Fe, Ni, and Au, alloys such as Inconel, Monel, Nimonic, carbon-copper, Fe—Ni-based Invar alloy, and Super Invar alloy, and the like. Multilayer metal plates formed by adding another metal layer or a ceramic layer to these metals are also included. In this case, when the overall coefficient of linear thermal expansion (CTE) with the additional layer is low, Cu, Al and the like are also used in the main metal layer. The metals used as the addition metal layer is not limited as long as they are those that strengthen the close contact property with the polyimide film and those that have properties that diffusion does not occur and the chemical resistance and heat resistance are favorable, but suitable examples thereof include Cr, Ni, TiN, and Mo-containing Cu.

It is desirable that the planar portion of the inorganic substrate is sufficiently flat. Specifically, the P-V value of the surface roughness is 50 nm or less, more preferably 20 nm or less, still more preferably 5 nm or less. When the surface is coarser than this, the adhesive strength between the polyimide film layer and the inorganic substrate may be insufficient.

The thickness of the inorganic substrate is not particularly limited, but a thickness of 10 mm or less is preferable, a thickness of 3 mm or less is more preferable, and a thickness of 1.3 mm or less is still more preferable from the viewpoint of handleability. The lower limit of the thickness is not particularly limited, but is preferably 0.05 mm or more, more preferably 0.3 mm or more, still more preferably 0.5 mm or more.

The silane coupling agent of the present invention has an action of being physically or chemically interposed between the inorganic substrate and the metal-containing layer and bonding the inorganic substrate and the polyimide film to each other.

Preferred specific examples of the silane coupling agent include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane hydrochloride, aminophenyltrimethoxysilane, aminophenethyltrimethoxysilane, and aminophenylaminomethylphenethyltrimethoxysilane.

Among the silane coupling agents, a silane coupling agent having one silicon atom in one molecule is particularly preferable, and examples thereof include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, aminophenyltrimethoxysilane, aminophenethyltrimethoxysilane, and aminophenylaminomethylphenethyltrimethoxysilane. When particularly high heat resistance is required in the process, a silane coupling agent, in which an aromatic group links Si and an amino group to each other via, is desirable.

In addition to the above, 11-amino-1-undecenethiol can also be used as the coupling agent.

Examples of the silane coupling agent include multivalent amine compounds.

As the method for forming a silane coupling agent layer, a method in which a silane coupling agent solution is applied to the inorganic substrate, a vapor deposition method, and the like can be used. The silane coupling agent layer may be formed on the surface of the heat-resistant polymer.

As the method for applying a silane coupling agent solution, it is possible to use a solution of a silane coupling agent diluted with a solvent such as an alcohol and to appropriately use conventionally known solution application means such as a spin coating method, a curtain coating method, a dip coating method, a slit die coating method, a gravure coating method, a bar coating method, a comma coating method, an applicator method, a screen printing method, and a spray coating method.

The silane coupling agent layer can also be formed by a vapor deposition method, and is specifically formed by exposing the inorganic substrate to the vapor of a silane coupling agent, namely, a silane coupling agent in a substantially gaseous state. The vapor of a silane coupling agent can be obtained by heating the silane coupling agent in a liquid state at a temperature of 40° C. to about the boiling point of the silane coupling agent. The boiling point of silane coupling agents varies depending on the chemical structure, but is generally in a range of 100° C. to 250° C. However, heating to 200° C. or more is not preferable since a side reaction on the organic group side of the silane coupling agent may be caused.

The environment for heating a silane coupling agent may be under any of raised pressure, normal pressure, or reduced pressure but is preferably under normal pressure or reduced pressure in the case of promoting the vaporization of the silane coupling agent. Since a large number of silane coupling agents are flammable liquids, it is preferable to perform the vaporization work in a closed container, preferably after purging the interior of the container with an inert gas. The time for exposing the inorganic substrate to a silane coupling agent is not particularly limited, but is preferably within 20 hours, more preferably within 60 minutes, still more preferably within 15 minutes, most preferably within 1 minute.

The temperature of the inorganic substrate during exposure of the inorganic substrate to a silane coupling agent is preferably controlled to an appropriate temperature between −50° C. and 200° C. depending on the kind of silane coupling agent and the desired thickness of the silane coupling agent layer.

The film thickness of the silane coupling agent layer is extremely thinner compared to those of the inorganic substrate, polyimide film and the like, is a thickness negligible from the viewpoint of mechanical design, and is only required to be minimum a thickness in the monomolecular layer order in principle. Generally, the film thickness is less than 20 nm, preferably 15 nm or less, and practically, preferably 10 nm or less, more preferably 7 nm or less, still more preferably 5 nm or less. However, when the film thickness is mathematically in a region of 5 nm or less, the silane coupling agent layer may exist in the form of a cluster rather than as a uniform coating film. The film thickness of the silane coupling agent layer can be calculated by the ellipsometry method or from the concentration of the silane coupling agent solution at the time of coating and the applied amount.

The laminate of the present invention can be preferably obtained by a lamination method in which [method A]
(1) a step of coating at least one surface of an inorganic substrate with a silane coupling agent;
(2) a step of wetting either or both of a silane coupling agent-coated surface of the inorganic substrate and a bonding surface side of a polyimide film with an aqueous medium;
(3) a step of stacking a polyimide film on the silane coupling agent-coated surface of the inorganic substrate; and
(4) a step of pressurizing the inorganic substrate and the polyimide film while extruding the aqueous medium from between the silane coupling agent-coated surface of the inorganic substrate and the bonding surface of the polyimide film
are performed in this order.

In addition, in the present invention, the laminate can be preferably obtained by a lamination method in which [method B]
(1) a step of coating at least one surface of a heat-resistant polyimide film with a silane coupling agent;
(2) a step of wetting either or both of a bonding surface side of an inorganic substrate and a silane coupling agent-coated surface of the polyimide film with an aqueous medium;
(3) a step of stacking the silane coupling agent-coated surface of the heat-resistant polyimide film on the inorganic substrate; and
(4) a step of pressurizing the inorganic substrate and the polyimide film while extruding the aqueous medium from between the bonding surface of the inorganic substrate and the silane coupling agent-coated surface of the polyimide film
are performed in this order.

Here, the aqueous medium is a general term for liquids that do not exhibit reactivity at room temperature, and so-called solvents can be used as the aqueous medium. Aqueous mediums preferably used in the present invention are water; monohydric alcohols, dihydric alcohols, and trihydric alcohols, which are liquid at room temperature; or mixtures containing two or more components among these.

As the method for wetting the bonding surface of the substrate or film with an aqueous medium, existing methods can be applied, such as dropping with a dropper or dispenser, discharging from a valve, or spraying from a spray nozzle in the form of mist. Immersing the substrate or film in an aqueous medium is also an effective means for wetting.

In the case of using a liquid containing water or an alcohol as the aqueous medium, the liquid also contributes to the promotion of the reaction of silane coupling agent.

As a method for bonding the substrate and the film to each other, a pressing method, a roll lamination method, and the like can be adopted. For example, pressurization can be performed in a planar or linear manner by pressing, lamination, or roll lamination in an atmosphere at the atmospheric pressure or in a vacuum. The process can also be promoted by performing heating during pressurization. In the present invention, pressing or roll lamination in the atmospheric air atmosphere is preferable, and particularly a method using a roll (roll lamination or the like) is preferable since bonding can be performed while sequentially extruding the aqueous medium at the bonding interface from the bonding surface.

The pressure at the time of the pressurization and heating treatment is preferably 0.1 MPa to 20 MPa, still more preferably 0.2 MPa to 3 MPa. When the pressure is 20 MPa or less, it is possible to suppress damage to the inorganic substrate. When the pressure is 0.1 MPa or more, it is possible to prevent the generation of a portion that is not in close contact and insufficient adhesion. The temperature at the time of the pressurization and heating treatment is preferably 80° C. to 400° C., more preferably 100° C. to 200° C. The polyimide film may be damaged when the temperature is too high, and the close contact force tends to be weak when the temperature is too low.

Although the pressurization and heating treatment can be performed in an atmosphere at the atmospheric pressure as described above, it may be possible to obtain uniform adhesive force by performing the pressurization and heating treatment in a vacuum. As the degree of vacuum, a degree of vacuum obtained by an ordinary oil-sealed rotary pump, namely, about 10 Torr or less is sufficient.

As a device that can be used for the pressurization and heating treatment, for example, an "11FD" manufactured by Imoto Machinery Co., Ltd. or the like can be used for performing pressing in a vacuum. For example, "MVLP" manufactured by MEIKI CO., LTD. or the like can be used for performing vacuum lamination using a roll-type film laminator in a vacuum or a film laminator for evacuating the air and then applying pressure at once to the entire surface of glass by a thin rubber film.

The pressurization and heating treatment can be performed by being divided into a pressurization process and a heating process. In this case, a pressure (preferably about 0.2 MPa to 50 MPa) is first applied to the polyimide film and the inorganic substrate at a relatively low temperature (for example, a temperature of less than 120° C., more preferably 80° C. or more and 110° C. or less) to secure the close contact with each other, and then, the polyimide film and the inorganic substrate are heated at a pressure (preferably 20 MPa or less and 0.2 MPa or more) or normal pressure and a relatively high temperature (for example, 80° C. or more, more preferably 100° C. to 250° C., still more preferably 120° C. to 220° C.), whereby the chemical reaction at the close contact interface can be promoted and the polyimide film and the inorganic substrate can be laminated.

It is thus possible to obtain a laminate in which the inorganic substrate and the polyimide film are bonded to each other.

However, the method for manufacturing the laminate according to the present invention is not limited to this example. As another example, the silane coupling agent layer is brought into contact with water at the time of lamination by dropping pure water on the polyimide film side, and the inorganic substrate is bonded to the polyimide film at almost the same time as the desired silane coupling agent layer is prepared.

By dropping pure water on both the polyimide film side and the inorganic substrate, the reaction of the silane coupling agent is promoted and the desired bonding state is obtained. The inorganic substrate may be bonded to the polyimide film by such a method.

Consequently, it is possible to obtain the laminate in the present invention, in which the 90-degree initial adhesive strength between the polyimide film and the inorganic substrate is 0.06 N/cm or more and 0.25 N/cm or less, the blister defect density is 1 spot or less per 500 mm×500 mm, the area is 0.8 square meter or more, and the length of one side is at least 1 m or more.

In the laminate, the 90-degree initial adhesive strength between the polyimide film and the inorganic substrate is required to be 0.06 N/cm or more, and is more preferably 0.09 N/cm or more, still more preferably 0.1 N/cm or more. The 90-degree initial adhesive strength is required to be 0.25 N/cm or less, and is more preferably 0.2 N/cm or less. When the 90-degree initial adhesive strength is 0.05 N/cm or more, it is possible to prevent the polyimide film from peeling off from the inorganic substrate before and during device formation. When the 90-degree initial adhesive strength is 0.25 N/cm or less, the inorganic substrate and the polyimide film are easily peeled off from each other after device formation. In other words, when the 90-degree initial adhesive strength is 0.25 N/cm or less, the inorganic substrate and the polyimide film are easily peeled off from each other even if the adhesive strength therebetween slightly increases during device formation.

In the present specification, the 90-degree initial adhesive strength refers to the 90-degree adhesive strength between the inorganic substrate and the polyimide film after the laminate is subjected to a heat treatment at 200° C. for 1 hour in the atmospheric air atmosphere.

The measurement conditions of the 90° initial adhesive strength are as follows.

The polyimide film is peeled off from the inorganic substrate at an angle of 90 degrees.

The measurement is performed 5 times and the average value thereof is taken as the measured value.

Measured temperature: Room temperature (25° C.)
Peeling speed: 100 mm/min
Atmosphere: Atmospheric air
Width of measured sample: 2.5 cm
More specifically, the method described in Examples is adopted.

In the present invention, a functional element is formed on a surface on the opposite side to the bonding surface of the polyimide film of the laminate obtained by the method A or the method B, and the polyimide film is peeled off from the substrate together with the functional element after formation, whereby a flexible electronic device can be fabricated.

In the present specification, the electronic device refers to a wiring board which carries out electrical wiring and has a single-sided, double-sided, or multi-layered structure, electronic circuits including active devices such as transistors and diodes and passive devices such as resistors, capacitors, and inductors, sensor elements which sense pressure, temperature, light, humidity and the like, biosensor elements, light emitting elements, image display elements such as liquid crystal displays, electrophoresis displays, and self-luminous displays, wireless and wired communication elements, arithmetic elements, storage elements, MEMS elements, solar cells, thin film transistors, and the like.

In the method for manufacturing a flexible electronic device in the present specification, an electronic device is formed on the polyimide film surface of a laminate fabricated by the above-described method and then the polyimide film is peeled off from the inorganic substrate.

The method for peeling off the polyimide film, on which an electronic device is formed, from the inorganic substrate is not particularly limited, but a method in which the polyimide film is stripped off from the end with tweezers and the like, a method in which a cut is made into the polyimide film, a pressure sensitive adhesive tape is pasted to one side of the cut portion, and then the polyimide film is stripped off from the tape portion, a method in which one side of the cut portion of the polyimide film is vacuum-adsorbed and then the polyimide film is stripped off from that portion, and the like can be adopted. When the cut portion of the polyimide film is bent with a small curvature at the time of peeling off, stress may be applied to the device at that portion and the device may be destroyed, and it is thus desirable to peel off the polyimide film in a state of having a curvature as large as possible. For example, it is desirable to strip off the polymer film while winding the polymer film on a roll having a large curvature or to strip off the polymer film using a machine having a configuration in which the roll having a large curvature is located at the peeling portion.

As the method for making a cut into the polyimide film, there are a method in which the polyimide film is cut using a cutting tool such as a cutter, a method in which the polyimide film is cut by scanning a laser and the laminate relative to each other, a method in which the polyimide film is cut by scanning a water jet and the laminate relative to each other, a method in which the polyimide film is cut while being cut a little to the glass layer using a dicing device for a semiconductor chip, and the like, but the method is not particularly limited. For example, when employing the above-described methods, it is also possible to appropriately employ a technique in which ultrasonic waves are superimposed on the cutting tool or a reciprocating motion, a vertical motion and the like are further added to improve the cutting performance.

It is also useful to stick another reinforcing base material to the portion to be peeled off in advance and peel off the polymer film together with the reinforcing base material. In a case where the flexible electronic device to be peeled off is the backplane of a display device, it is also possible to obtain a flexible display device by sticking the frontplane of the display device in advance, integrating these on an inorganic substrate, and then peeling off these two at the same time.

EXAMPLES

Hereinafter, the present invention will be described in detail with reference to Examples, but the present invention is not limited to the following Examples as long as the gist of the present invention is not exceeded.

Unless otherwise stated, the respective measured values in Examples and Comparative Examples were measured by the following methods.

<Reduced Viscosity of Polymer>

A solution prepared by dissolving the polymer in N-methyl-2-pyrrolidone (or N,N-dimethylacetamide) so as to have a polymer concentration of 0.2 g/dl was subjected to the measurement of reduced viscosity at 30° C. using an Ubbelohde type viscosity tube. (When the solvent used to prepare the polyamic acid solution was N,N-dimethylacetamide, the polymer was dissolved using N,N-dimethylacetamide and subjected to the measurement.)

<Regional Surface Roughness, Maximum Protrusion Height, Peak Density of Support for Polyimide Film Fabrication>

The regional surface roughness (Sa), maximum protrusion height (Sp), and peak density (Spd) of the support for polyimide film fabrication were measured in conformity with ISO 25178-2: 2012.

<Thickness of Polyimide Film>

The thickness of the polymer film was measured using a micrometer (Millitron 1245D manufactured by Feinpruf GmbH).

<Tensile Elasticity, Tensile Breaking Strength, and Tensile Breaking Elongation of Polyimide Film>

The polyimide film was cut into a strip shape of 100 mm×10 mm respectively in the machine direction (MD direction) and the transverse direction (TD direction) to prepare a test piece. The test piece was cut from the center portion in the transverse direction. The tensile elasticity, tensile breaking strength, and tensile breaking elongation in each of the MD direction and the TD direction were measured at a temperature of 25° C., a tensile speed of 50 mm/min, and a distance between chucks of 40 mm using a tensile tester (Autograph (R), Model name: AG-5000A manufactured by Shimadzu Corporation).

<Coefficient of Linear Thermal Expansion (CTE)>

The expansion/contraction rate of a polyimide film in the machine direction (MD direction) and the transverse direction (TD direction) was measured under the following conditions, the expansion/contraction rate/temperature was measured at an interval of 15° C. such as 30° C. to 45° C. and 45° C. to 60° C., this measurement was performed up to 300° C., and the average value of all the measured values was calculated as CTE.

Instrument name: TMA4000S manufactured by MAC Science Corporation
Length of sample: 20 mm
Width of sample: 2 mm
Start temperature in rising temperature: 25° C.
End temperature in rising temperature: 400° C.
Rising rate of temperature: 5° C./min
Atmosphere: Argon <Measurement of Adhesive Strength>

The adhesive strength of the polyimide film from the laminate obtained in the laminate fabrication by the 90-degree peeling method was determined by the following method.

The film is peeled off from the inorganic substrate at an angle of 90 degrees.

Measuring instrument: Autograph AG-IS manufactured by Shimadzu Corporation
Measured temperature: Room temperature (25° C.)
Peeling speed: 100 mm/min
Atmosphere: Atmospheric air
Width of measured sample: 2.5 cm
The measurement was performed on a total of 5 points of the center portion and four corners of the laminate, and the average value thereof was determined.

The measurement was performed after the laminate was subjected to a heat treatment at 200° C. for 1 hour in the atmospheric air atmosphere and after the laminate was subjected to the heat treatment and further a heat treatment at 450° C. for 1 hour, and the former was taken as the initial adhesive strength and the latter was taken as the adhesive strength after heat treatment.

<Counting of Blister Defects>

In the present invention, those having a long diameter of 300 μm or more were counted as blisters. Blisters are also called float defects or bubble defects, are spots where the film floats like a bubble but is not bonded to the substrate, and are often generated as the film is lifted like a tent by sandwiching a relatively hard foreign matter.

In the present invention, the laminate was magnified and observed by focusing on the bonding surface between the inorganic substrate and the polyimide film, and the number of blisters having a long diameter of 300 μm or more was counted for at least 4 sheets of laminates having a G2 (370 mm×470 mm) size, 2 sheets of laminates having a G4.5 (730 mm×920 mm) size, and 1 sheet of laminate having a G5 (1100 mm×1250 mm) size, and converted to the number per 1 square meter.

<Yellow Index (YI)>

Using a color meter (ZE6000 manufactured by NIPPON DENSHOKU INDUSTRIES CO., LTD.) and a C2 light source, the tristimulus values, XYZ values of the polyimide film were measured in conformity with ASTM D1925, and the yellow index (YI) was calculated by the following equation. The same measurement was performed three times and the arithmetic mean value thereof was adopted.

$$YI=100\times(1.28X-1.06Z)/Y$$

<400 nm Light Transmittance>

The light transmittance at a wavelength of 400 nm was measured using a spectrophotometer ("U-2001" manufactured by Hitachi, Ltd.), the acquired value was converted to a thickness of 20 μm according to the Lambert-Beer's law, and the acquired value was taken as the 400 nm light transmittance of the polyimide film. The same measurement was performed three times and the arithmetic mean value thereof was adopted.

<Total Light Transmittance (TT)>

The total light transmittance (TT) of the polyimide film was measured using HAZEMETER (NDH5000 manufactured by NIPPON DENSHOKU INDUSTRIES CO., LTD.). A D65 lamp was used as the light source. The same measurement was performed three times and the arithmetic mean value thereof was adopted.

<HAZE Value>

The haze of the polyimide film was measured using HAZEMETER (NDH5000 manufactured by NIPPON DENSHOKU INDUSTRIES CO., LTD.). A D65 lamp was used as the light source. The same measurement was performed three times and the arithmetic mean value thereof was adopted.

[Preparation of Polyamic Acid Solution A]

The interior of a reaction vessel equipped with a nitrogen inlet tube, a thermometer, and a stirring rod was purged with nitrogen, and then 176.5 g (0.900 mol) of 1,2,3,4-cyclobutanetetracarboxylic dianhydride (CBDA), 31.0 g (0.100 mol) of 4,4'-oxydiphthalic acid (ODPA), 160.1 g (0.500 mol) of 2,2'-ditrifluoromethyl-4,4'-diaminobiphenyl (TFMB), 113.6 g (0.500 mol) of 4-amino-N-(4-aminophenyl)benzamide (DABAN), and 2000 g of N,N-dimethylacetamide were put into the reaction vessel under a nitrogen atmosphere and stirred at room temperature for 24 hours. The mixture was then diluted with 1000 g of N,N-dimethylacetamide to obtain a polyamic acid solution A having a reduced viscosity of 4.50 dl/g.

[Preparation of Polyimide Solution B]

The interior of a reaction vessel equipped with a nitrogen inlet tube, a thermometer, and a stirring rod was purged with nitrogen, and then 461 g of N,N-dimethylacetamide (DMAC) and 64.0 g (0.200 mol) of 2,2'-ditrifluoromethyl-4,4'-diaminobiphenyl (TFMB) were put into the reaction vessel under a nitrogen atmosphere and stirred to dissolve TFMB in DMAC. Subsequently, an anhydride (6FDA) was put into 89.737 g (0.202 mol) of 4,4'-(2,2-hexafluoroisopropyridene)diphthalic acid for about 10 minutes under a nitrogen stream while stirring the interior of the reaction vessel, stirring was continuously performed for 6 hours as it was while adjusting the temperature so as to be in a temperature range of 20° C. to 40° C. to conduct the polymerization reaction, and a viscous polyamic acid solution was thus obtained.

Next, 410 g of DMAC was added to the obtained polyamic acid solution for dilution, and then 25.83 g of isoquinoline as an imidization accelerator was added thereto, the polyamic acid solution was kept in a temperature range of 30° C. to 40° C. while being stirred, 122.5 g (1.20 mol) of acetic anhydride as an imidizing agent was added thereto while being gradually dropped for about 10 minutes, then the liquid temperature was further maintained at 30° C. to 40° C. and stirring was continuously performed for 12 hours to conduct the chemical imidization reaction, and a polyimide solution was thus obtained.

Next, 1000 g of the obtained polyimide solution containing an imidizing agent and an imidization accelerator was transferred to a reaction vessel equipped with a stirring device and a stirring blade, kept at a temperature of 15° C. to 25° C. while being stirred at a speed of 120 rpm, and 1500 g of methanol was dropped thereto at a rate of 10 g/min. When about 800 g of methanol was added, turbidity of the polyimide solution was confirmed, and precipitation of powdery polyimide was confirmed. Subsequently, 1500 g of the entire amount of methanol was added to complete the precipitation of polyimide. Subsequently, the contents in the reaction vessel were separated by filtration using a suction filtration device, and further washed with 1000 g of methanol and separated by filtration. Thereafter, 50 g of the polyimide powder separated by filtration was dried at 50° C. for 24 hours using a dryer equipped with a local exhaust device, further dried at 260° C. for 2 hours to remove the remaining volatile components, and a polyimide powder was thus obtained. The reduced viscosity of the obtained polyimide powder was 5.40 dl/g.

Next, 40 g of the obtained polyimide powder was dissolved in 300 g of DMAc to obtain a polyimide solution B.

[Preparation of Polyimide Solution C]

While introducing nitrogen gas into a reaction vessel equipped with a nitrogen inlet tube, a Dean-Stark tube and a reflux tube, a thermometer, and a stirring rod, 120.5 g (0.485 mol) of 4,4'-diaminodiphenyl sulfone (4,4'-DDS), 51.6 g (0.208 mol) of 3,3'-diaminodiphenyl sulfone (3,3'-DDS), and 500 g gamma-butyrolactone (GBL) were added into the reaction vessel. Subsequently, 217.1 g (0.700 mol) of 4,4'-oxydiphthalic dianhydride (ODPA), 223 g of GBL, and 260 g of toluene were added at room temperature, then the temperature was raised to an internal temperature of 160° C., and the mixture was heated under reflux at 160° C. for 1 hour for imidization. After the imidization was completed, the temperature was raised to 180° C., and the reaction was continuously conducted while extracting toluene. After the reaction for 12 hours, the oil bath was removed and the temperature was returned to room temperature, GBL was added so that the concentration of solid was 20% by mass, and a polyimide solution C having a reduced viscosity of 2.50 dl/g was thus obtained.

Fabrication Example 1 of Polyimide Film

The polyamic acid solution A was applied (coating width: 1240 mm) to a mirror-finished endless continuous belt made of stainless steel as a polyimide film fabrication support using a die coater, and dried at 90° C. to 115° C. for 10 minutes. The polyamic acid film which was self-supporting after drying was peeled off from the support and both ends thereof were cut, thereby obtaining a green film.

The obtained green film was transported by a pin tenter so that the final pin sheet interval was 1140 mm, and subjected to a heat treatment at 170° C. for 2 minutes as the first stage, at 230° C. for 2 minutes as the second stage, and at 350° C. for 6 minutes as the third stage. Thereafter, the film was cooled to room temperature for 2 minutes, the portions exhibiting poor flatness of both ends of the film were cut off using a slitter, and the film was wound into a roll shape, thereby obtaining a polyimide film 1A presented in Table 1.

Polyimide films 1B and 1C presented in Table 1 were obtained in the same manner by changing the polyamic acid solution to the polyimide solution B or the polyimide solution C and changing the coating thickness on the support.

Fabrication Example 2 of Polyimide Film

The polyamic acid solution A was applied (coating width: 1240 mm) to a polyester film, in which the regional surface roughness (Sa) was 1 nm, the maximum protrusion height (Sp) was 7 nm, the peak density (Spd) was 20/μm² or less, and the surface does not have a coating layer, as a polyimide film fabrication support using a comma coater, and dried at 90° C. to 115° C. for 10 minutes. The polyimide film (containing the solvent at 10% by weight), which was self-supporting after drying, was peeled off from the support and both ends thereof were cut, thereby obtaining a green film.

The obtained green film was transported by a pin tenter so that the final pin sheet interval was 1140 mm, and subjected to a heat treatment at 170° C. for 2 minutes as the first stage, at 230° C. for 2 minutes as the second stage, and at 350° C. for 6 minutes as the third stage to remove the solvent. Thereafter, the film was cooled to room temperature for 2 minutes, the portions exhibiting poor flatness of both ends of the film were cut off using a slitter, and the film was wound into a roll shape, thereby obtaining a polyimide film 2A presented in Table 1.

Polyimide films 2B and 2C presented in Table 1 were obtained in the same manner by changing the polyamic acid solution to the polyimide solution B or the polyimide solution C and changing the coating thickness on the support.

Fabrication Example 3 of Polyimide Film

The polyamic acid solution A was applied (coating width: 450 mm) to an unstretched polypropylene film, in which the regional surface roughness (Sa) was 3 nm, the maximum protrusion height (Sp) was 12 nm, and the peak density (Spd) was 25/μm² or less, as a polyimide film fabrication support using a comma coater, and dried at 85° C. to 105° C. for 30 minutes, thereby obtaining a bilayer film of a support and a polyamic acid film (containing the solvent at about 8% by mass). Next, two layers of this bilayer film were stretched at the same time by 2.8 times in the MD direction by utilizing the difference in peripheral velocity of the rolls. The bilayer film was disposed so that the rolls did not come into contact with the surface on the polyamic acid film side of the bilayer film between the rolls having different peripheral velocities. After stretching in the MD direction, both ends of the bilayer film were gripped with a clip tenter, the bilayer film was transported while being heat-treated at 150° C. so that the final pin sheet interval was 1140 mm, that is, the bilayer film was stretched by 2.5 times in the TD direction. Thereafter, the polyimide film was peeled off from the support of the bilayer film, and further a heat treatment was performed at 350° C. for 3 minutes to remove the solvent. Thereafter, the film was cooled to room temperature for 2 minutes, the portions exhibiting poor flatness of both ends of the film were cut off using a slitter, and the film was wound into a roll shape, thereby obtaining a polyimide film 3A presented in Table 1.

Polyimide films 3B and 3C presented in Table 1 were obtained in the same manner by changing the polyamic acid solution to the polyimide solution B or the polyimide solution C and changing the coating thickness on the support.

<Fabrication of Laminate>

Example 1

First, the polyimide film 1 obtained in Fabrication Example 1 was cut to have a width of 1090 mm×1240 mm. Next, UV/O₃ irradiation was performed for 3 minutes using a UV/O₃ irradiator (SKR1102N-03 manufactured by LANTECHNICAL SERVICE CO., LTD.) as a film surface treatment. At this time, the distance between the UV/O₃ lamp and the film was set to 30 mm.

Using the device of which the schematic diagram was illustrated in FIG. 1, a G5 size (1100 mm×1250 mm, 0.7 mm thick glass substrate: OA10G manufactured by Nippon Electric Glass Co., Ltd.) was coated with 3-aminopropyltrimethoxysilane (KBM-903 manufactured by Shin-Etsu Chemical Co., Ltd.) as a silane coupling agent using a spray coater. The glass substrate used was washed with pure water, dried, and then irradiated using a UV/O₃ irradiator (SKR1102N-03 manufactured by LANTECHNICAL SERVICE CO., LTD.) for 1 minute for dry cleaning.

The glass substrate coated with a silane coupling agent in this manner was set in a roll laminator equipped with a silicon rubber roller. First, 500 ml of pure water as an aqueous medium was dropped onto the silane coupling agent-coated surface using a dropper so as to spread over the entire substrate, thereby wetting the substrate.

Next, the treated surface of the polyimide film was stacked on the substrate so as to face the silane coupling agent-coated surface of the glass substrate, namely, the surface wetted with pure water, and the stacked body was pressurized while extruding pure water between the polyimide film and the glass substrate using a rotating roll sequentially from one side of the glass substrate to laminate the glass substrate and the polyimide film, thereby obtaining a temporary laminate. The laminator used was a laminator having an effective roll width of 1350 mm (manufactured by MCK CO., LTD.), and the bonding conditions were: air source pressure: 0.5 MPa, laminating speed: 50 mm/sec, roll temperature: 22° C., environmental temperature: 22° C., and humidity: 55% RH.

The obtained temporary laminate was subjected to a heat treatment at 200° C. for 10 minutes in a clean oven to obtain the laminate according to the present invention. The evaluation results of the obtained laminates are presented in Table 2.

Examples 2 to 9 and Comparative Example 1

The laminates were fabricated in the same manner under the conditions presented in Table 2, and the properties of the laminates were evaluated. The results are presented in Table 2.

Examples 10 to 18 and Comparative Example 2

The laminates were fabricated in the same manner under the conditions presented in Table 3, and the properties of the laminates were evaluated. The results are presented in Table 3.

TABLE 1

| | | | Film No. | | | | | | | |
|---|---|---|---|---|---|---|---|---|---|---|
| | | | 1A | 1B | 1C | 2A | 2B | 2C | 3A | 3B | 3C |
| Polyamic acid solution or polyimide solution | | | A | B | C | A | B | C | A | B | C |
| Polyimide film fabrication support | | | Stainless steel endless belt | Stainless steel endless belt | Stainless steel endless belt | Polyester film | Polyester film | Polyester film | Unstretched polypropylene film | Unstretched polypropylene film | Unstretched polypropylene film |
| Film thickness | | μm | 12.5 | 38.0 | 25.0 | 25.0 | 12.5 | 38.0 | 38.0 | 12.5 | 25.0 |
| Film width | | mm | 1160 | 1160 | 1160 | 1160 | 4 | 1160 | 1160 | 1160 | 1160 |
| Yellow index | | | 3.8 | 1.3 | 2.1 | 3.9 | 1.3 | 2.0 | 3.7 | 1.2 | 2.2 |
| Light transmittance at wavelength of 400 nm | | % | 78.5 | 82.5 | 79.7 | 80.6 | 79.9 | 80.0 | 75.2 | 88.6 | 80.3 |
| Total light transmittance | | % | 88.0 | 91.0 | 88.2 | 91.3 | 93.6 | 95.8 | 89.9 | 79.9 | 83.6 |
| Haze | | | 0.4 | 0.3 | 0.4 | 0.4 | 0.3 | 0.4 | 0.4 | 0.3 | 0.4 |
| Tensile breaking strength | MD | MPa | 373.0 | 156.2 | 135.9 | 393.8 | 144.9 | 127.0 | 407.2 | 435.0 | 155.6 |
| | TD | | 381.5 | 148.0 | 138.1 | 403.1 | 139.4 | 128.2 | 419.0 | 449.0 | 173.7 |
| Tensile elasticity | MD | GPa | 5.1 | 4.1 | 3.2 | 5.2 | 4.0 | 3.3 | 6.7 | 6.1 | 3.5 |
| | TD | | 5.3 | 3.9 | 3.4 | 4.8 | 3.7 | 3.5 | 6.2 | 6.1 | 4.0 |
| Tensile breaking elongation | MD | % | 11.2 | 48.2 | 13.7 | 11.9 | 45.0 | 14.4 | 13.4 | 12.4 | 17.9 |
| | TD | | 10.1 | 52.1 | 12.8 | 11.0 | 49.8 | 11.6 | 11.0 | 18.9 | 16.7 |
| Coefficient of linear expansion (CTE) | MD | ppm/°C. | 16.5 | 44.1 | 50.7 | 15.7 | 47.0 | 41.2 | 6.3 | 8.0 | 21.2 |
| | TD | | 17.9 | 47.6 | 48.9 | 18.3 | 51.4 | 36.8 | 6.7 | 9.3 | 18.7 |

TABLE 2

| | Example 1 | Example 2 | Example 3 | Example 4 | Example 5 | Example 6 | Example 7 | Example 8 | Example 9 | Comparative Example 1 |
|---|---|---|---|---|---|---|---|---|---|---|
| Film | 1A | 2A | 3A | 2A | 2B | 2C | 3A | 3B | 3C | 3B |
| Inorganic substrate | Glass | Glass | Glass | Glass | Glass | Glass | Glass | Glass | Glass | Glass |
| Inorganic substrate size | G5 | G5 | G5 | G5 | G5 | G5 | G5 | G5 | G5 | G5 |
| Film surface treatment | UV/O$_3$ | UV/O$_3$ | UV/O$_3$ | UV/O$_3$ | UV/O$_3$ | UV/O$_3$ | UV/O$_3$ | UV/O$_3$ | UV/O$_3$ | UV/O$_3$ |
| SCA coating | Glass side | Glass side | Glass side | Glass side | Glass side | Glass side | Glass side | Glass side | Glass side | Glass side |
| SCA | KBM903 | KBM903 | KBM903 | KBM903 | KBM903 | KBM903 | KBM903 | KBM903 | KBM903 | KBM903 |
| Aqueous medium | Pure water | Pure water | Pure water | Pure water | Pure water | Pure water | Pure water | Pure water | Pure water | Nil |
| Initial adhesive strength (N/cm) | 0.15 | 0.09 | 0.16 | 0.13 | 0.16 | 0.14 | 0.11 | 0.10 | 0.15 | 0.60 |
| Adhesive strength after heat treatment (N/cm) | 0.15 | 0.18 | 0.16 | 0.14 | 0.11 | 0.17 | 0.10 | 0.11 | 0.12 | 0.83 |
| Blister defect density (spots/square meter) | 1.5 | 2.2 | 1.5 | 3.6 | 2.9 | 1.5 | 0.0 | 0.0 | 0.0 | 84.3 |

TABLE 3

| | Example 10 | Example 11 | Example 12 | Example 13 | Example 14 | Example 15 | Example 16 | Example 17 | Example 18 | Comparative Example 2 |
|---|---|---|---|---|---|---|---|---|---|---|
| Film | 1A | 2A | 3A | 2A | 2B | 2C | 3A | 3B | 3C | 3B |
| Inorganic substrate | Glass | Glass | Glass | Glass | Glass | Glass | Glass | Glass | Glass | Glass |
| Inorganic substrate size | G5 | G5 | G5 | G5 | G5 | G5 | G5 | G5 | G5 | G5 |
| Film surface treatment | UV/O$_3$ | UV/O$_3$ | UV/O$_3$ | UV/O$_3$ | UV/O$_3$ | UV/O$_3$ | UV/O$_3$ | UV/O$_3$ | UV/O$_3$ | UV/O$_3$ |

TABLE 3-continued

| | Example 10 | Example 11 | Example 12 | Example 13 | Example 14 | Example 15 | Example 16 | Example 17 | Example 18 | Comparative Example 2 |
|---|---|---|---|---|---|---|---|---|---|---|
| SCA coating | Film side | Film side | Film side | Film side | Film side | Film side | Film side | Film side | Film side | Film side |
| SCA | KBM903 | KBM903 | KBM903 | KBM903 | KBM903 | KBM903 | KBM903 | KBM903 | KBM903 | KBM903 |
| Aqueous medium | Pure water + MeOH | Pure water + MeOH | Pure water + MeOH | Pure water + MeOH | Pure water + MeOH | Pure water + MeOH | Pure water + MeOH | Pure water + MeOH | Pure water + MeOH | Nil |
| Initial adhesive strength (N/cm) | 0.19 | 0.08 | 0.20 | 0.16 | 0.20 | 0.16 | 0.10 | 0.13 | 0.13 | 0.48 |
| Adhesive strength after heat treatment (N/cm) | 0.13 | 0.23 | 0.19 | 0.16 | 0.10 | 0.16 | 0.08 | 0.09 | 0.15 | 1.38 |
| Blister defect density (spots/square meter) | 2.2 | 1.5 | 3.6 | 2.9 | 3.6 | 2.9 | 0.0 | 0.0 | 0.0 | 143.0 |

In the tables,
SCA: Silane coupling agent,
Glass: OA10G manufactured by Nippon Electric Glass Co., Ltd.
Inorganic substrate size (glass size)
G5 size (1100 mm×1250 mm)
Aqueous medium
Pure water: Ultrapure water
Pure water+MeOH: Pure water 99/Methanol 1 (mass ratio).

Application Example

The following steps were performed using the laminate obtained in Example 9, whereby a tungsten film (thickness: 75 nm) was formed on the polyimide film by a vacuum vapor-deposition method and further a silicon oxide film (thickness: 150 nm) as an insulating film was laminated and formed thereon without touching the atmospheric air. Next, a silicon oxide nitride film (thickness: 100 nm) to be the ground insulating film was formed by the plasma CVD method, and further an amorphous silicon film (thickness: 54 nm) was laminated and formed without touching the atmospheric air.

Next, the hydrogen element of the amorphous silicon film was removed to promote crystallization, and a heat treatment at 500° C. was performed for 40 minutes to form a polysilicon film.

A TFT device was fabricated using the obtained polysilicon film. First, patterning of the polysilicon thin film was performed to form a silicon region having a predetermined shape, as appropriate, a gate insulating film was formed, a gate electrode was formed, a source region or a drain region was formed by doping the active region, the interlayer insulating film was formed, the source electrode and drain electrode were formed, and the activation treatment was performed, thereby fabricating a P-channel TFT array using polysilicon.

The polyimide film portion was burned off by a UV-YAG laser along about 0.5 mm inner side of the TFT array periphery, and the polyimide film was peeled off from the end of the cut using a thin razor-shaped blade so as to scoop up, thereby obtaining a flexible A3 size TFT array. The peeling was possible by extremely weak force, and it was possible to peel off the TFT array without damaging the TFT. The obtained flexible TFT array did not show any deterioration in performance even when wound around a 3 mmφ round bar, and maintained favorable properties.

Industrial Applicability

As described above, the method for manufacturing a laminate and the laminate obtained by the method of the present invention can stably realize low adhesive strength without unevenness in the case of a large area as well, the generation frequency of blister defects is extremely low, and thus the laminate is extremely useful as a temporary support substrate for manufacturing a flexible device having high quality and a large area.

The invention claimed is:

1. A laminate comprising:
    an inorganic substrate;
    a silane coupling agent layer; and
    a polyimide film of which a yellow index is 10 or less, a light transmittance at a wavelength of 400 nm is 70% or more, a tensile elasticity in both a MD direction and a TD direction is 3 GPa or more, and CTE in both a MD direction and a TD direction is −5 ppm/° C. to +55 ppm/° C.
    in this order such that the polyimide film is bonded to a surface of the inorganic substrate with the silane coupling agent layer therebetween,
    wherein an initial adhesive strength by a 90-degree peeling method when the polyimide film is peeled off from the laminate is 0.06 N/cm or more and 0.25 N/cm or less over the entire surface of the inorganic substrate to which the polyimide film is bonded.

2. The laminate according to claim 1, wherein a blister defect density is 5 spots or less per 1 square meter.

3. The laminate according to claim 1, wherein the polyimide film is rectangular, has an area of 0.65 square meter or more, and has a rectangular side of at least 700 mm or more.

4. The laminate according to claim 1, wherein the silane coupling agent layer comprises a silane coupling agent having one silicon atom in one molecule.

5. A method for manufacturing the laminate according to claim 1, the method comprising at least:
    (1) a step of coating at least one surface of the inorganic substrate with a silane coupling agent;
    (2) a step of wetting either or both of a silane coupling agent-coated surface of the inorganic substrate and a bonding surface side of the polyimide film with an aqueous medium;
    (3) a step of stacking the polyimide film on the silane coupling agent-coated surface of the inorganic substrate; and
    (4) a step of pressurizing the inorganic substrate and the polyimide film while extruding the aqueous medium from between the silane coupling agent-coated surface of the inorganic substrate and the bonding surface of the polyimide film.

6. A method for manufacturing the laminate according to claim 1, the method comprising at least:

(1) a step of coating at least one surface of the polyimide film with a silane coupling agent;
(2) a step of wetting either or both of a bonding surface side of the inorganic substrate and a silane coupling agent-coated surface of the polyimide film with an aqueous medium;
(3) a step of stacking the silane coupling agent-coated surface of the polyimide film on the inorganic substrate; and
(4) a step of pressurizing the inorganic substrate and the polyimide film while extruding the aqueous medium from between the bonding surface of the inorganic substrate and the silane coupling agent-coated surface of the polyimide film.

7. A method for manufacturing a flexible device, the method comprising a step of forming a functional element on a surface on an opposite side to the bonding surface with the inorganic substrate of the polyimide film of the laminate obtained in the manufacturing process according to claim 5.

8. A method for manufacturing a flexible device, the method comprising a step of forming a functional element on a surface on an opposite side to the bonding surface with the inorganic substrate of the polyimide film of the laminate obtained in the manufacturing process according to claim 6.

* * * * *